United States Patent
Nakata et al.

(10) Patent No.: US 7,214,753 B2
(45) Date of Patent: May 8, 2007

(54) N-VINYL AMIDE POLYMER AND PRODUCTION METHOD THEREOF

(75) Inventors: Yoshitomo Nakata, Nishinomiya (JP); Norihiro Wakao, Yokohama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 11/086,758

(22) Filed: Mar. 23, 2005

(65) Prior Publication Data

US 2005/0215740 A1    Sep. 29, 2005

(30) Foreign Application Priority Data

Mar. 24, 2004   (JP)   ............... 2004-087741
Mar. 24, 2004   (JP)   ............... 2004-087742

(51) Int. Cl.
*C08F 26/08*   (2006.01)

(52) U.S. Cl. .................. 526/264; 526/303.1
(58) Field of Classification Search ........ 526/264, 526/303.1
See application file for complete search history.

(56) References Cited

U.S. PATENT DOCUMENTS

| | | | |
|---|---|---|---|
| 4,612,336 A | 9/1986 | Yada et al. | |
| 4,795,802 A | 1/1989 | Nuber et al. | |
| 4,816,534 A | 3/1989 | Nuber et al. | |
| 5,239,053 A * | 8/1993 | Tseng et al. | ............ 528/483 |
| 5,354,945 A | 10/1994 | Detering et al. | |
| 5,698,647 A | 12/1997 | Huckestein et al. | |
| 6,103,425 A | 8/2000 | Harada et al. | |
| 6,465,592 B1 | 10/2002 | Kitada et al. | |
| 6,642,333 B2 * | 11/2003 | Nakata | ............ 526/264 |
| 2002/0156218 A1 * | 10/2002 | Nakata et al. | ............ 526/303.1 |

FOREIGN PATENT DOCUMENTS

| | | |
|---|---|---|
| EP | 0 215 379 A2 | 3/1987 |
| JP | 46-2094 | 10/1971 |
| JP | 51-82387 | 7/1976 |
| JP | 51-126284 | 11/1976 |
| JP | 52-47084 | 4/1977 |
| JP | 61-155405 A | 7/1986 |
| JP | 63-68609 A | 3/1988 |
| JP | 63-156810 A | 6/1988 |
| JP | 64-26604 A | 1/1989 |
| JP | 05-239118 A | 9/1993 |
| JP | 09-110912 A | 4/1997 |
| JP | 10-101886 A | 4/1998 |
| JP | 2000-034307 A | 2/2000 |
| JP | 2001-048938 A | 2/2001 |
| JP | 2002-069115 A | 3/2002 |
| WO | WO-94/20555 A1 | 9/1994 |
| WO | WO 01/05847 A1 | 1/2001 |

\* cited by examiner

*Primary Examiner*—Helen L. Pezzuto
(74) *Attorney, Agent, or Firm*—Connolly, Bove, Lodge & Hutz, LLP

(57) ABSTRACT

The present invention provides an innovative N-vinylamide polymer with decreased contents of impurities and suppressed coloration, a higher K-value, and preferably usable in a variety of fields such as cosmetic and pharmaceutical products, and to provide a production method of the polymer. An N-vinylamide polymer comprising an N-vinylamide monomer unit, wherein the N-vinylamide polymer has K-value of 60 or higher, a content of hydrolysis products of N-vinylamide monomer of 0.02% by weight or less, a content of ashes of 0.1% by weight or less, and hue of 10% aqueous solution of 10 or less measured according to JIS K0071.

14 Claims, 1 Drawing Sheet

N-VINYL AMIDE POLYMER AND PRODUCTION METHOD THEREOF

TECHNICAL FIELD

The present invention relates to an N-vinylamide polymer and production method thereof. More particularly, the present invention relates to an N-vinylamide polymer used for various applications such as production raw materials of pressure sensitive adhesives bonding agents, coating materials, dispersants, ink, electronic parts and the like, and other than pharmaceutical products and cosmetics, additives for food and the like and the production method thereof.

BACKGROUND ART

An N-vinylamide polymer has advantageous properties such as biocompatibility, safety, and hydrophilicity and functions as a thickening agent, a flocculant and the like, and thus is useful for production raw materials of pressure sensitive adhesives, coating materials, dispersants, ink, electronic parts and the like other than pharmaceutical products and cosmetics, additives for food and the like. To make such an N-vinylamide polymer suitably used for these various applications, improvements in qualities, abilities, and safety are important.

Conventionally, in the case of producing, for example, polyvinylpyrrolidone, to lower remaining N-vinylpyrrolidone (NVP), a method, in which NVP is hydrolyzed after the polymerization, has been known. In this method, hydrolysis products such as 2-pyrrolidone (2-py), acetaldehyde and the like are produced and sometimes cause toxicity, malodor, and coloration. Further, a method of decreasing the NVP by adding an initiator afterward during polymerization has also been known, however in this case, hydrolysis may be promoted during polymerization to produce 2-py and the like. Also, when polymerization is carried out in a solvent, it is possible to suppress hydrolysis of monomers, but K-value decrease. Therefore elimination of the problems are needed.

With respect to production methods of conventional N-vinylamide polymer, the following methods have been disclosed.

That is, a method of producing polyvinylpyrrolidone (PVP) with a high K-value while suppressing generation of hydrazine, an impurity, by using an azo initiator (e.g. reference to Japanese Kokai Publication Hei 9-110912 (page 2)). In such a production method, no description of the amount of 2-pyrrolidone, an impurity, but when polymerization is carried out according to the disclosed conditions, at least 0.05% of 2-pyrrolidone may be produced during polymerization. Also, in many cases, commercialized polyvinylpyrrolidone having K-value of 90 contains 0.1% or more of 2-pyrrolidone.

With respect to the N-vinylamide polymer such as polyvinylpyrrolidone, generally, its property is expressed with the K-value. The K-value means a value calculated according to Fickencher's formula from a relative viscosity of an aqueous solution of 1% by weight of the N-vinylamide polymer measured by a capillary viscometer and is supposed to have a correlation with the molecular weight of the polymer. In the case of the N-vinylamide polymer, the polymer has amido bonds and the bonds are adsorbed on a column of gel permeation chromatography (GPC) to disable precise molecular weight analysis and therefore, the K-value is employed instead.

As a production method of vinylpyrrolidone polymers, continuous polymerization of vinylpyrrolidone in an organic solvent under pressure of 1 Barr or higher and a high temperature in the presence of a radical polymerization initiator is disclosed (e.g. reference to Japanese Kokai Publication Sho-51-82387 (page 1–2)). In this production method, there is a description that polymers of N-vinylpyrrolidone having K-value of 10 to 35 with little amount of impurities are produced by polymerizing N-vinylpyrrolidon in an organic solvent under pressure.

As a production method of N-vinyl-2-pyrrolidone polymers, production of the polymers with K-value of 10 to 100 by adding di(tertiary butyl)peroxide to an aqueous solution of 10 to 80% by weight of N-vinyl-2-pyrrolidone for polymerization and adding an adjustment agent during the polymerization is disclosed (e.g. reference to Japanese Kokai Publication Sho-63-156810 (page 2)). In this production method, there is a description that the mixture is stirred and simultaneously the polymerization is carried out and that the obtained polymers contain 50% by weight or more of polymerized N-vinyl-2-pyrrolidone and are clearly dissolved in water and an organic solvent, and that the polymers are free from hydrazine. Further, no description regarding the amount of 2-pyrrolidone, an impurity, is given, but when polymerization is carried out according to the disclosed conditions, at least 0.1% of 2-pyrrolidone may be produced during the polymerization.

As a production method of vinylpyrrolidone polymers, production of the polymers by adding a water-soluble organic peroxide and a sulfite salt to an aqueous solution of vinylpyrrolidone is disclosed (e.g. reference to Japanese Kokai Publication 2002-69115 (pages 2, and 4 to 6)). However, in this production method, the addition amount of sodium sulfite is high and the vinylpyrrolidone polymer obtained may contain approximately 0.1% or more of sodium as an ash component relative to the polymer.

Accordingly, the production method still has a room for contrivance to improve and to produce the vinylpyrrolidone polymer with lesser contents of impurities such as 2-pyrrolidone and ash components and higher K-value.

Further, with respect to a water-soluble polymer production method, it is disclosed that an aqueous solution containing at least 50% by weight of a monomer is irradiated with radiation beam in form of a thin film having a thickness of 2 cm or thinner on an underlay placed under a radiation beam source (e.g. reference to Japanese Kokai Publication Sho-46-2094 (pages 1, 2 and 5)). In this production method, it is described that the reaction temperature is 5 to 100° C. and the reaction is preferably carried out without supplying heat. Also, in the Example, it is described that N-vinylpyrrolidone is used as the monomer and benzoin isopropyl ether is used as a photopolymerization initiator. However, in such a production method, coloration of the obtained polymer or coloration over time may not be avoided.

With respect to another water-soluble polymer production method, it is disclosed that an acrylic polymer is obtained by supplying an aqueous monomer solution containing a cationic vinyl monomer and a nonionic surfactant in 3 to 10 mm thickness on a movable belt and radiating UV rays to the solution (e.g. reference to Japanese Kokai Publication Sho-61-155405 (pages 1 and 2)).

In this production method, the surfactant is added to the aqueous monomer solution so as to suppress gelation of the acrylic polymer and at the same time provide the polymer with a high molecular weight.

Further, with respect to a water-absorptive resin production method, it is disclosed that the obtained water-containing gel-phase polymer is kept at a temperature lower than the peak temperature by at least 10° C. for not shorter than 30 minutes in the static aqueous solution polymerization of the monomer component (e.g. reference to Japanese Kokai Publication 2000-34307 (pages 2 and 7 to 10)). However, in this production method, the Example has a description that polymerization is carried out using acrylic acid and its salt as main components of monomer components by a movable type belt polymerization apparatus. Also, it is described that the monomer concentration is preferably 45% or lower.

With respect to a radical polymerization method of an unsaturated water-soluble monomer, it is disclosed that in the case of carrying out radical polymerization of an unsaturated water-soluble monomer or the like in a layer having a thickness of 2 to 100 mm by using UV rays, an anthraquinone derivative and dissolved chloride ion are added to carry out the polymerization (e.g. reference to Japanese Kokai Publication Sho-52-47084 (pages 1, 3 and 4)). In this production method, it is also described that (meth)acrylamide in 50% by weight or more is preferably used and also vinylpyrrolidone is preferable to be used. Further, description says that the polymerization temperature is 0 to 100° C. and the obtained polymer may be used for a caking additive, a finishing agent, a glue or the like.

With respect to a gel composition suitable for a high polymer solid electrolyte, it is described that the gel composition contains a cross-linked polymer obtained by polymerization of monomer components comprising cyclic N-vinyllactam and an organic solvent (e.g. reference to Japanese Kokai Publication Hei-10-101886 (pages 2, 5 and 7)), and that the cross-linked polymer is obtained by static polymerization on a belt or a tray. Also, the Example has a description that using an azo initiator as a polymerization initiator and N-vinyl-2-pyrrolidone in a monomer concentration of 30% by weight as the cyclic N-vinyllactam, reaction is carried out at 50° C.

Further, with respect to a polymer suitable for a thickener and a soil amendment agent, a copolymer of N-vinylpyrrolidone and acrylic acid is described (e.g. reference to Japanese Kokai Publication 2001-48938 (pages 2 and 5)). The Example has a description that using an azo initiator as a polymerization initiator and N-vinyl-2-pyrrolidone and sodium acrylate as monomer components, reaction is carried out at 45 to 70° C. reaction temperature and 35% monomer concentration.

However, in the above-mentioned production method, there still remain problems to be solved that production of 2-pyrrolidone and ash components cannot be suppressed all together to sufficiently low, or the obtained polymers are colored.

With respect to a conventional N-vinylamide polymer production method, a method of removing vinylpyrrolidone from a vinylpyrrolidone polymer by treating an aqueous or alcohol solution of the vinylpyrrolidone polymer with an adsorbent is disclosed (e.g. reference to Japanese Kokai Publication Sho-63-68609 (page 1)). However, the method of using an adsorbent requires treatment in solution state and thus the solution is limited in relation to the viscosity and it is supposed that 2-pyrrolidone, a hydrolysis product, may not be removed sufficiently.

Also, with respect to a production method of a polymer obtained by polymerizing and introducing N-vinylpyrrolidone, it is disclosed that a contaminant with a low molecular weight is separated from a polymer solution at 20 to 100° C. and 1 to 80 Barr using an ultrafilter (e.g. reference to Japanese Kokai Publication Hei-5-239118 (pages 2 and 3 to 6)). In such a method, the treatment in solution state is also required and in the Example, there is only a description of decrease ratio of 2-pyrrolidone before and after the treatment, but it is supposed that generally approximately 1% of contaminant is generated on completion of polymerization and the contaminant may remain approximately 500 ppm in the polymer. Further, since polymerization is carried out using hydrogen peroxide, the obtained polymer may be colorized.

Such refining methods by adsorbent treatment and ultrafiltration and the like are carried out in solution state, resulting in the lower quantities of the polymers treated per unit time. Further, the viscosities of the solutions treated are limited, and particularly in the case of an N-vinylamide polymer with a high K-value, the treatment has to be carried out at a low solution concentration resulting in further decrease of the productivity and thus these methods are not practical. Accordingly, there was a room for contrivance to solve these inconveniences, to sufficiently improve the productivity, and to produce the N-vinylamide polymer suitable for uses such as cosmetics and pharmaceutical products.

With respect to a method of producing a hydrophilic polymer with a low remaining monomer content, it is disclosed that a water-containing gel-phase polymer is dried by being brought into contact with a gas containing at least steam and having a dew point of 50 to 100° C. at a temperature of 80 to 250° C. (e.g. reference to Japanese Kokai Publication Sho-64-26604 (pages 1 to 2, 4 and 6 to 12)).

In the Example, there is a description that a gel-phase polymer with a water content of 25% or higher is produced from an acrylic acid salt and acrylamide as main components of monomer and dried until the solid concentration reaches to 96% at highest and that the remaining monomer concentration in the obtained hydrophilic polymer is 20 to 2200 ppm.

With respect to a method for separating a trace amount of vinyl chloride monomer from a vinyl chloride resin powder, it is disclosed that the vinyl chloride resin powder wetted with a water-based solvent is heated and that the vinyl chloride monomer existing in the water-based solvent is evaporated and separated in a normal or reduced pressure (e.g. reference to Japanese Kokai Publication Sho-51-126284 (pages 1 to 3)).

These methods have no description regarding production of the N-vinylamide polymer used for cosmetics and pharmaceutical products and there was a room for contrivance to improve a production suitably employed for such polymer production.

SUMMARY OF THE INVENTION

In view of the above state of the art, it is an object of the present invention to provide an innovative N-vinylamide polymer with decreased contents of impurities such as remaining monomers and hydrolysis of the monomers and suppressed coloration, a higher K-value, and preferably usable in a variety of fields such as cosmetic and pharmaceutical products, and to provide a production method of the polymer.

The present inventors have made various investigations concerning a production method of an N-vinylamide polymer and have found that the N-vinylamide polymer with little impurities and a high K-value can be obtained by carrying out polymerization in a reaction solution having a monomer concentration in a specified range using a specified initiator in the production method of an N-vinylamide polymer, that polymerization is carried out within a short time by carrying out the polymerization in a specified temperature range and accordingly hydrolysis of the monomer is suppressed to obtain the N-vinylamide polymer with preferably further decreased impurities. And the present inventors also have found that the N-vinylamide polymer with sufficiently decreased coloration and impurity contents may be produced without occurrence of side reaction or fume generation caused by runaway of the reaction since heat removal is easily carried out in such polymerization manner by carrying out the polymerization of the reaction solution in a layer state with a depth of specified value or lower.

The inventors have also found that in the case the production of N-vinylamide polymer, N-vinylamide polymer is dried in a solid state such as a powder having a particle diameter of a specified value or smaller or a film with a thickness of a specified value or thinner and then moisturized under a relative humidity of a specified value or higher, the polymer in a solid state may sufficiently be plasticized with water and accordingly the remaining monomer and the like may freely move in the polymer and be evaporated easily from the surface, resulting in remarkable suppression of the content of the remaining monomer. Further, the inventors have found that according to such a method, unlike a conventional method of adding an initiator afterward to decrease the content of the monomer, addition of an unnecessary compound is not needed, and consequently, the impurity amount in the polymer may sufficiently be decreased.

As described in the present invention, refinement by treating the N-vinylamide polymer in solid state is innovative and the refining technique to suppress the remaining monomer such as N-vinylpyrrolidone and hydrolysis products of the monomer such as 2-pyrrolidone to 100 ppm or lower simultaneously is also innovative. Since refining has been carried out conventionally in solution state, the refining is limited in the viscosity of the solution and productivity is insufficient, particularly in the case of product with a high K-value, it is necessary to increase the dilution ratio, whereas in the case of the present invention, the impurities may be sufficiently removed with no limit in the K-value and the viscosity to result in sufficiently increased productivity.

Furthermore, the inventors have made various investigations on the N-vinylamide polymer and have found that when the K-value is adjusted to be in a specified high value range, the N-vinylamide polymer has excellent basic properties. Moreover the inventors have focused on the remaining N-vinylamide monomer and hydrolysis products of N-vinylamide monomer and ashes (inorganic components) contaminating as impurities in the N-vinylamide polymer during the production method, and have found that suppression of the contents of such impurities to a specified value or less and suppression of coloration gives the innovative N-vinylamide polymer suitable for uses such as cosmetics and pharmaceutical products, leading to solution of the above-mentioned problems and to completion of the present invention.

That is, the present invention provides a production method of N-vinylamide polymer comprising a step of polymerizing a monomer component in a water-based solvent,
wherein said polymerization step is a polymerization step carried out by adjusting a monomer concentration in a reaction solution to be 40 to 90% by weight and using an azo initiator and/or hydrogen peroxide.

The present invention also provides an N-vinylamide polymer comprising an N-vinylamide monomer unit,
wherein said N-vinylamide polymer has K-value of 60 or higher, a content of hydrolysis products of N-vinylamide monomer of 0.02% by weight or less, a content of ashes of 0.1% by weight or less, and hue of 10% aqueous solution of 10 or less measured according to JIS K0071.

The present invention further provides an N-vinylamide polymer comprising an N-vinylamide monomer unit,
wherein said N-vinylamide polymer has a content of a N-vinylamide monomer of 10 ppm or less and a content of hydrolysis products of N-vinylamide monomer of 100 ppm or less.

DETAILED DESCRIPTION OF THE INVENTION

Figure 1:
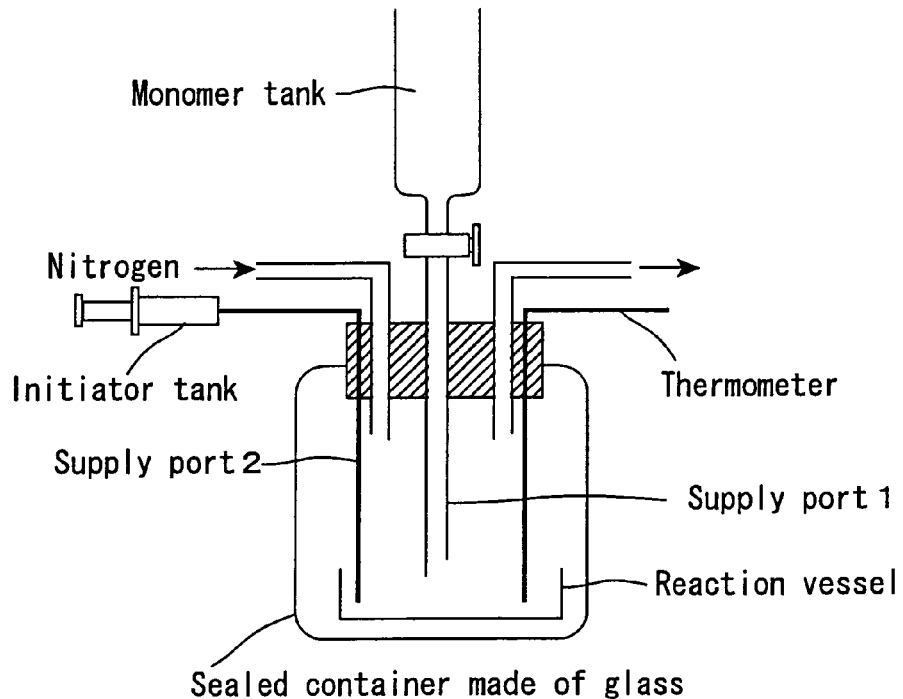
FIG. 1 is a schematic drawing of a reaction apparatus employed in Examples.

The present invention will, hereinafter, be described in detail.

A production method of an N-vinylamide polymer of the present invention is a method suitable for producing an N-vinylamide polymer having any K-value, and is not especially limited in a content of impurities in the N-vinylamide polymer to be obtained, and is capable of producing an N-vinylamide polymer having a specified K-value and a sufficiently lowered content of impurities such as 2-pyrrolidone and advantageous in terms of the productivity and economical efficiency.

In this invention, when the monomer concentration in a reaction solution is controlled to be 40 to 90% by weight (mass %), the N-vinylamide polymer suitably usable in a variety of fields such as cosmetics and pharmaceutical products can be produced. The lower limit is preferably 55% by weight and more preferably 60% by weight. The upper limit is preferably 85% by weight and more preferably 80% by weight. The preferable range is 55 to 85% by weight, more preferably 60 to 80% by weight.

In the above-mentioned polymerization step, an azo initiator and/or hydrogen peroxide is to be used as a polymerization initiator. The azo initiator is a preferable initiator to be used in the case of obtaining a polymer with a K-value as high as 60 or higher and hydrogen peroxide is a preferable initiator to be used in the case of obtaining a polymer with a K-value not higher than 60.

The use amount of the polymerization initiator is preferably 0.001 to 10% by weight, more preferably 0.005 to 5% by weight, and even more preferably 0.01 to 1% by weight to 100% by weight of a monomer component.

In the case of using the azo initiator, it is preferable to be used in 0.01 to 1% by weight to the monomer component and this embodiment is one of preferable embodiments of the present invention.

In the above-mentioned polymerization step, thermal and/or photo-polymerization is preferable.

In the polymerization method, the polymerization conditions in the case of thermal polymerization may properly be set depending on the composition of the monomer component and solvent and the like, and the polymerization temperature is preferably 0 to 250° C., more preferably 20 to 200° C., and even more preferably 40 to 150° C. With respect to the reaction pressure, in the case of a high temperature reaction, the pressure may be a normal pressure or a higher pressure, but in the case strict temperature control is required, a normal pressure is preferable. Further, the polymerization time is preferably 5 to 120 minutes, more preferably 5 to 60 minutes, even more preferably 10 to 50 minutes, and even more preferably 10 to 40 minutes.

In the case of photopolymerization, polymerization is preferable to be carried out by radiation of UV rays and as an apparatus for radiating UV rays, a high pressure mercury lamp, a low pressure mercury lamp, a metal halide lamp, a fluorescent chemical lamp, and a fluorescent blue-emitting lamp may be exemplified. The radiation intensity of UV rays may properly be set depending on the monomer concentration and preferably 10 to 100 $W/m^2$ and more preferably 20 to 50 $W/m^2$. The radiation time is preferably 1 to 60 minutes and more preferably 5 to 30 minutes.

In the above-mentioned polymerization step, it is one of preferable embodiments of the present invention to keep a temperature of the reaction solution to be 100° C. or higher for 3 to 45 minutes. The N-vinylamide polymer hardly causes gelation even at 100° C. or higher, and such operation produces the N-vinylamide polymer suitably usable for various uses. The holding time is more preferably 5 to 40 minutes and even more preferably 10 to 35 minutes. The temperature of the reaction solution is increased by the heat from the outside and polymerization heat, and in this invention, since the monomer concentration is high, the temperature is kept at 100° C. or higher even under a normal pressure.

The state that the temperature of the reaction solution is kept at 100° C. or higher means a state that the reaction solution is kept continuously at 100° C. or higher in any period from starting to finishing of polymerization.

In the present invention, as described above, it is effective to hold the reaction solution at 100° C. or higher for 3 minutes or longer for shortening the reaction time and accordingly generation of 2-pyrrolidone is suppressed and consequently, colorization and the like is prevented. In a conventional technique, it has been supposed undesirable to keep the temperature at 100° C. or higher in the case of a high concentration polymerization just like belt polymerization since it causes gelation, but in the present invention, it is found that limiting the monomer component to N-vinylamide monomer brings to a desirable effect on suppression of side reaction owing to the condition of 100° C. or high, which is utterly unexpected before.

In the present invention, it is preferable to carry out polymerization by keeping the solution depth of the reaction solution containing a water-based solvent and a monomer component to be 50 mm or shallower. When the polymerization is performed in such a state, the polymerization is carried out uniformly with no need of stirring the reaction solution and even in the case the reaction solution has a high viscosity, polymerization is sufficiently carried out and also the solvent removal may be carried out easily. Further, impurity contamination may be suppressed.

Polymerization in the condition of a reaction solution depth of 50 mm or shallower means a polymerization state that the reaction solution is spread thinly in a reaction vessel and for example, it is preferable to carry out polymerization on standing without fluidizing the reaction solution by stirring etc. Also, polymerization may be carried out in batch type polymerization state or in continuous polymerization state, and in the case of continuous polymerization, belt polymerization state where the polymerization is carried out using, for example, a belt conveyer type continuous polymerization apparatus is preferable. As the reaction vessel, those which are capable of keeping a state of the reaction solution depth of 50 mm or shallower may be employed and not only vessel-like ones having a certain depth but also plate-like ones scarcely having a depth for the case that the reaction solution has a high viscosity may also be employed.

When the reaction solution depth exceeds 50 mm, bumping is caused, the reaction compounds are scattered, or abnormal heat generation occurs in some cases and it possibly results in insufficient decrease of the K-value. The depth is more preferably 35 mm or shallower, even more preferably 25 mm or shallower, and further even more preferably 15 mm or shallower.

The above-mentioned production method is a method for producing an N-vinylamide polymer essentially containing N-vinylamide monomer unit, and the production method of N-vinylamide polymer, wherein the production method comprises a step of treating the N-vinylamide polymer in a powder state with a particle size of 500 µm or smaller or in a film-like state with a thickness of 10 mm or thinner in a condition of relative humidity of 50% or higher is also preferable and such a method is also one of preferable embodiments of the present invention.

The above-mentioned production method is also suitable for a production method of the N-vinylamide polymer having any K-value, and is not particularly limited in a content of impurities in the N-vinylamide polymer to be obtained, is advantageous in terms of productivity. Refining the N-vinylamide polymer by such a method sufficiently removes impurities contained in the N-vinylamide polymer to obtain the N-vinylamide polymer usable for various uses such as pharmaceutical products and cosmetics. The N-vinylamide polymer may be polymers that essentially comprise an N-vinylamide monomer unit and preferably polymers that are obtained by the above-mentioned polymerization method.

In the present invention, the N-vinylamide polymer is refined in form of a powder with particle diameter of 500 µm or smaller, or in form of a film with a thickness of 10 mm or thinner.

In the case of refining the N-vinylamide polymer in form of a powder, the particle diameter is 500 µm or smaller and when it exceeds 500 µm, impurities may not be removed sufficiently. The particle diameter is preferably 400 µm or smaller, more preferably 300 µm or smaller, and even more preferably 200 µm or smaller. In the case of refining the N-vinylamide polymer in form of a film, the thickness of the film is 10 mm or thinner and when it exceeds 10 mm, impurities may not be removed sufficiently. The thickness is preferably 5 mm or thinner, more preferably 1 mm or thinner, and even more preferably 0.1 mm or thinner.

The above-mentioned particle diameter is an average particle diameter and the particle diameter is measured according to dry sieving test method defined as "Sieving Test Method of Chemical Products" of JIS K0069.

In the present invention, the N-vinylamide polymer is treated in relative humidity 50% or higher condition. When the relative humidity is lower than 50%, the polymer in the solid state may not be plasticized sufficiently. The relative humidity is preferably 55% or higher and more preferably 60% or higher. It is also preferably 90% or lower and more preferably 80% or lower.

The temperature in the above-mentioned treatment is preferably 50 to 150° C. When it is lower than 50° C., it possibly takes a long time to remove the impurities and when it exceeds 150° C., adverse effects on physical properties, for example, decrease of molecular weight may be caused. The lower limit is preferably 60° C. and more preferably 70° C. The upper limit is preferably 120° C. and more preferably 100° C. The range is preferably 60 to 120° C. and more preferably 70 to 100° C.

The above-mentioned treatment time may properly be set depending on the treatment conditions and impurity contents and the like, and for example, it is preferably 15 minutes to 5 hours, more preferably 30 minutes to 4 hours, and even more preferably 45 minutes to 3 hours.

The treatment method of the N-vinylamide polymer in the above-mentioned production method is sufficient as long as the method keeps the N-vinylamide polymer in the above-mentioned relative humidity condition, and examples of preferable method include (1) a method of treating the N-vinylamide polymer in static state; (2) a method of treating the N-vinylamide polymer while moving the polymer; and (3) a method combining the former methods.

As the above-mentioned method (1), it is preferable that the N-vinylamide polymer is spread and kept standing, for example, in a treatment container or a treatment apparatus in the case the N-vinylamide polymer is in the powder state. Also, in the case of the film-like state, it is preferable that the film is kept standing while being prevented from overlapping with other films; or the film is kept still while being prevented from contact with wall faces of a treatment container or the like; or the film is treated in a manner that these treatments are combined.

As the above-mentioned method (2), it is preferable that in the case the N-vinylamide polymer is in the powder state, the powder of N-vinylamide polymer is stirred by a stirring blade and the like, fluidized under a current of gas, moved by rotating or swinging a treatment container or the like, or treated in a manner that these treatments are combined. As the method of fluidizing the polymer under a current of gas, it is preferable to move the powder by leading or blowing steam to the powder. On the other hand, in the case the N-vinylamide polymer is in a form of a film, it is preferable to move the film by blowing steam to the film.

In the present invention, in the case the N-vinylamide polymer is in a powder state, it is preferable that the treatment step is carried out in a condition that the N-vinylamide polymer in a powder state is stirred and/or fluidized under a current of gas. Treatment under stirring or fluidizing condition in such a manner prevents fusion (blocking) of the N-vinylamide polymer and sufficiently removes remaining monomers and the like.

As apparatuses to be employed for the treatment, for example, a box type drying apparatus, a fluidizing tank drying apparatus, a conical drier, or the like are preferable.

The present invention also provides an N-vinylamide polymer comprising an N-vinylamide monomer unit, wherein said N-vinylamide polymer has K-value of 60 or higher, a content of hydrolysis products of N-vinylamide monomer of 0.02% by weight or less, a content of ashes of 0.1% by weight or less, and hue of 10% aqueous solution of 10 or less measured according to JIS K0071.

The above-mentioned N-vinylamide polymer may be preferably obtained by the above-mentioned production method of the present invention and one of preferable embodiments of the present invention is that the N-vinylamide polymer obtained by the above-mentioned production method has a K-value of 60 or higher, a content of hydrolysis products of N-vinylamide monomer of 0.02% by weight or less, a content of ashes of 0.1% by weight or less, and 10% aqueous solution hue of 10 or less measured according to JIS K0071.

The N-vinylamide polymer of the present invention has a K-value of 60 or higher. When it is lower than 60, basic functions desired for various uses may not be exhibited sufficiently. The lower limit is preferably 70, more preferably 80 and even more preferably 90. The upper limit is preferably 200, more preferably 150, and even more preferably 120. The range is preferably 70 to 200, more preferably 80 to 150, and even more preferably 90 to 120.

The above-mentioned K-value can be calculated according to the following Fickencher's expression from the relative viscosity of an aqueous solution of 1% by weight of the N-vinylamide polymer measured by a capillary viscometer at 25° C.:

$$\log \eta_{rel}/C = [(75K_0^2)/(1+1.5K_0C)] + K_0,$$

wherein $K = 1000 K_0$;

C is the weight (g) of N-vinylamide polymer in 100 ml of the solution; and $\eta_{rel}$ is relative viscosity.

The N-vinylamide polymer of the present invention has a speechified lower content of speechified impurities. With respect to the speechified impurities, when the content of the hydrolysis products of the N-vinylamide monomer exceeds 0.02% by weight, toxicity, malodor, or coloration and the like may not sufficiently be lowered to result in failure in improvement of the safety and suitability of the polymer for use such as cosmetics or pharmaceutical products. It is preferably 0.002% by weight or lower, more preferably 0.0002% by weight or lower, even more preferably 0.00002% by weight or lower, and further even more preferably, the N-vinylamide polymer is practically free from the hydrolysis products of the N-vinylamide monomer.

The above-mentioned hydrolysis products are compounds produced by hydrolyzing the N-vinyl amide monomer and for example, in the case of using N-vinylpyrrolidone as the monomer, 2-pyrrolidone, and acetaldehyde and the like are exemplified.

The content of the hydrolysis products of the N-vinylamide monomer can quantitatively be determined by liquid chromatography.

When the content of the ashes exceeds 0.1% by weight, for example, in the case the polymer is dissolved in an organic solvent, the turbidity may not be sufficiently decreased, and the suitability of the polymer as a pharmaceutical raw material may not be improved sufficiently. The content of the ashes is preferably 0.08% by weight or lower, more preferably 0.05% by weight or lower, even more preferably 0.02% by weight or lower, and further even more preferably, polymer is practically free from the ashes.

The ashes mean non-combustible residues remaining after combustion of the N-vinylamide polymer and essentially contain inorganic substances and their oxides. Examples of the inorganic substances may include substances containing a sodium atom, a potassium atom, a magnesium atom, a calcium atom, and the like.

The content of the ashes can be measured according to a measurement method of intensely burned residues defined by Japanese Pharmacopoeia.

With respect to the above-mentioned N-vinylamide polymer, a 10% aqueous solution of the polymer has hue of 10 or less measured according to JIS K0071. When it exceeds 10, the polymer may be insufficient for suitable uses such as cosmetics or pharmaceutical products. It is preferably 8 or lower and more preferably 5 or lower.

The above-mentioned hue is defined by APHA and can be measured according to JIS K0071.

With respect to the above-mentioned N-vinylamide polymer, the content of the N-vinylamide monomer is preferably 1.5% by weight or lower. When it exceeds 1.5% by weight, the content of impurities produced by hydrolysis may not be decreased. It is more preferably 1.0% by weight and even more preferably 0.5% by weight.

The content of the N-vinylamide polymer can be measured similarly to the content of the above-mentioned hydrolysis products of the N-vinylamide monomer.

The present invention further provides an N-vinylamide polymer comprising an N-vinylamide monomer unit, wherein said N-vinylamide polymer has a content of a N-vinylamide monomer of 10 ppm or less and a content of hydrolysis products of N-vinylamide monomer of 100 ppm or less.

The above-mentioned N-vinylamide polymer can be preferably obtained by the above-mentioned production method of the present invention and one of preferable embodiments of the present invention is that the N-vinylamide polymer obtained by the above-mentioned production method has a content of the N-vinylamide monomer of 10 ppm or less and a content of hydrolysis products of N-vinylamide monomer of 100 ppm or less.

The N-vinylamide polymer of the present invention has a content of the N-vinylamide monomer of 10 ppm or less. When it exceeds 10 ppm, the polymer may be insufficient for suitable uses such as cosmetics or pharmaceutical products and the like. It is preferably 8 ppm or lower, more preferably 5 ppm or lower, even more preferably 3 ppm or lower, and further even more preferably, the N-vinylamide polymer is practically free from the N-vinylamide monomer.

The content of the N-vinylamide monomer can quantitatively be determined by liquid chromatography.

The content of the hydrolysis products of the N-vinylamide monomer is 100 ppm or lower and when it exceeds 100 ppm, toxicity, malodor, or coloration may not sufficiently be lowered to result in failure in improvement of the safety and suitability of the polymer for use such as cosmetics, pharmaceutical products or the like. It is preferably 50 ppm or lower, more preferably 10 ppm or lower, even more preferably 1 ppm or lower, and further even more preferably, the N-vinylamide polymer is practically free from the hydrolysis products of the N-vinylamide monomer.

The above-mentioned hydrolysis products are compounds produced by hydrolyzing the N-vinylamide monomer, and for example, in the case of using N-vinylpyrrolidone as the monomer, 2-pyrrolidone, and acetaldehyde and the like are exemplified.

The content of the hydrolysis products of the N-vinylamide monomer can quantitatively be determined similarly to the content of the above-mentioned N-vinylamide monomer.

The N-vinylamide polymer of the present invention includes impurities produced during the production of the N-vinylamide polymer. The impurities mean specified impurities such as remaining N-vinylamide monomer and N-vinylamide monomer hydrolysis products (hereinafter, referred to as specified impurities), and impurities other than the specified impurities (hereinafter, referred to as other impurities). The N-vinylamide polymer of the present invention, as described above, has a little and specified lower content of the specified impurities. The content in this invention means the content ratio of the impurities relative to the N-vinylamide polymer free from the impurities or from which impurities are removed.

In the above-mentioned N-vinylamide polymer, preferably the ash content and hue (APHA) are respectively in the ranges described above.

Conventional N-vinylamide polymers are polymers easily colored owing to the impurities and the like as compared with other polymers comprising, for example, acrylic acid salt and acrylamide as monomer main components, but in the present invention, such coloration is sufficiently reduced.

As the K-value of the above-mentioned N-vinylamide polymer, the lower limit is preferably 10. The polymer may sufficiently exhibit basic functions desired for uses such as cosmetic and pharmaceutical products by setting the K-value in such a range. The lower limit is more preferably 20, even more preferably 50, and further even more preferably 80. The upper limit of the K-value is preferably 250, more preferably 200, even more preferably 150, and further even more preferably 120. The range of the K-value is preferably 10 to 250, more preferably 20 to 200, even more preferably 50 to 150, and further even more preferably 80 to 120.

The N-vinylamide polymer of the present invention may be in any form of powder, granule, flake, film, gel, or liquid without any particular limit.

In the case of the powder state, for measurement of the contents of the N-vinylamide monomer and its hydrolysis products, the powder may be dissolved in a proper solvent to be liquid.

The N-vinylamide polymer of the present invention essentially contains the N-vinylamide monomer. As the N-vinylamide monomer unit, those that have N-vinylamide structure may be exemplified and for example, the N-vinylamide monomer unit is preferably structure unit represented by the following formula (1);

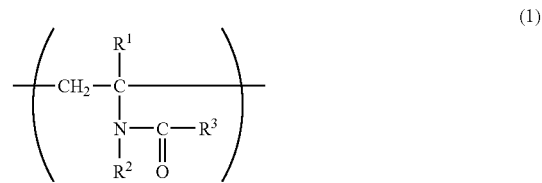

(1)

wherein $R^1$ represents a hydrogen atom or a methyl group; $R^2$ and $R^3$ may be same or different and respectively represent a hydrogen atom, a methyl group, or an ethyl group; $R^2$ and $R^3$ may be bonded to form an alkylene group having 3 to 5 carbon atoms. As such N-vinylamide polymer, those that are obtained by polymerizing monomer components essentially containing the N-vinylamide monomer are preferable. The N-vinylamide polymer of the present invention may also be those that are obtained by refining after the polymerization of such monomer components.

As the above-mentioned N-vinylamide monomer, polymerizable compounds having the N-vinylamide structure can be exemplified and for example, the N-vinylamide monomers are preferably monomers represented by the following formula (2);

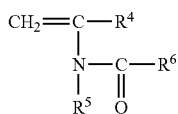

(2)

wherein $R^4$ represents a hydrogen atom or a methyl group; $R^5$ and $R^6$ may be same or different and respectively represent a hydrogen atom, a methyl group, or an ethyl group; $R^5$ and $R^6$ may be bonded to form an alkylene group having 3 to 5 carbon atoms.

As the monomers defined by the above-mentioned formula (2), N-vinylacetamide, N-methyl-N-vinylacetamide, N-vinylformamide, N-methyl-N-vinylformamide, N-vinylpropionamide, N-vinylpyrrolidone, N-vinylpiperidone, and N-vinylcaprolactam are preferable and one or two or more of them may be used. Among them, N-vinylpyrrolidone is preferable.

The content of the above-mentioned N-vinylamide monomer is preferably 25% by weight or more in 100% by weight of monomer components. When the content is less than 25% by weight, the properties such as hydrophilicity and adsorptive property derived from the N-vinylamide monomer unit may exhibited insufficiently in the polymers. The content is more preferably 50% by weight or more and even more preferably 75% by weight or more. Particularly, all monomer components is preferably N-vinylamide monomer.

The above-mentioned monomer components may contain other copolymerizable monomers and for example, one or two or more kinds of the following monomers may be used:

(1) (meth)acrylic acid esters such as methyl(meth)acrylate, ethyl(meth)acrylate, butyl(meth)acrylate, cyclohexyl (meth)acrylate, and hydroxyethyl(meth)acrylate;
(2) (meth)acrylamide derivatives such as (meth)acrylamide, N-monomethyl(meth)acrylamide, N-monoethyl(meth) acrylamide, and N,N-dimethyl(meth)acrylamide;
(3) basic unsaturated monomers, their salts or quaternary compounds such as dimethylaminoethyl(meth)acrylate, dimethylaminoethyl(meth)acrylamide, vinylpyridine, and vinylimidazole;
(4) iminoethers such as vinyloxazoline and isopropenyloxazoline;
(5) carboxyl group-containing unsaturated monomers and their salts such as (meth)acrylic acid, itaconic acid, maleic acid, and fumaric acid;
(6) hydroxyl group-containing unsaturated monomers such as 2-hydroxyethyl(meth)acrylate, 2-hydroxypropyl(meth) acrylate, 3-hydroxypropyl(meth)acrylate, 2-hydroxybutyl (meth)acrylate, 3-hydroxybutyl(meth)acrylate, 4-hydroxybutyl(meth)acrylate, methyl-2-(hydroxymethyl) acrylate, ethyl-2-(hydroxymethyl)acrylate, polyethylene glycol mono(meth)acrylate, polypropylene glycol mono (meth)acrylate, tris(hydroxyethyl)isocyanuric acid mono (meth)acrylate, tris(hydroxyethyl)isocyanuric acid di(meth)acrylate, pentaerythritol mono(meth)acrylate, pentaerythritol di(meth)acrylate, and pentaerythritol tri (meth)acrylate;
(7) unsaturated anhydrides such as maleic anhydride and itaconic anhydride;
(8) vinyl esters such as vinyl acetate and vinyl propionate;
(9) vinylethylene carbonate and its derivatives;
(10) styrene and its derivatives;
(11) ethyl(meth)acrylic acid-2-sulfonate and its derivatives;
(12) unsaturated sulfonic acid and its derivatives such as vinylsulfonic acid and its derivatives, (meth)acrylamidomethylsulfonic acid, (meth)acrylamidoethylsulfonic acid, and (meth)acrylamidopropanesulfonic acid;
(13) vinyl ethers such as methyl vinyl ether, ethyl vinyl ether, and butyl vinyl ether;
(14) olefins such as ethylene, propylene, octene, and butadiene; and
(15) glycidyl group-containing unsaturated monomers such as glycidyl(meth)acrylate.

The above-mentioned monomer components are preferably usable for the above-mentioned production method and preferably contains the above-mentioned N-vinylamide monomer.

The content of these monomers in the above-mentioned production method is preferably similar to that as described above and the monomer components may be those which are capable of forming the N-vinylamide polymer and may contain the above-mentioned other copolymerizable monomers.

As polymerization methods of the N-vinylamide polymer, for example, an aqueous solution polymerization method, a solution polymerization method in an organic solvent, a reverse phase suspension polymerization method, an emulsion polymerization method, a precipitation polymerization method, and a bulk polymerization method and the like are preferable and the reaction conditions may properly be set depending on the polymerization methods. Also, polymerization may be carried out by the above-mentioned production method. In these polymerization methods, thermal and/or photo-polymerization is preferable.

The polymerization state may be preferably stirring polymerization state, static polymerization state, or belt polymerization state and the like.

In the above-mentioned stirring polymerization state, since the concentration and the viscosity is too high to stir the reaction solution by a common stirring pan or to carry out heat removal, it is preferable to use an apparatus having a powerful stirring force such as a kneader or an extruder to carry out the reaction continuously.

As the mentioned-above kneader, an apparatus having blades arranged in parallel inside of a container and capable of completely mixing even highly viscous materials within a short time by applying external force such as compressive, shearing, and tensile force to the materials by the rotation of the blades and kneading repeatedly, and simultaneously the apparatus more preferably enable to control the material temperature inside the container by heating or cooling the outside of the container or the blade. The extruder is a cylindrical apparatus provided with a screw and there are a uniaxial extruder and a biaxial extruder and they are also apparatuses suitable for mixing materials with high viscosity just like the materials of the present invention.

In the present invention, not only the polymerization reaction is carried out using the kneader or extruder but also a successive post-treatment or deformation step may be carried out using the kneader or extruder and for example, on completion of the polymerization, an acidic substance may be added and mixed together with the reaction solution by the kneader or extruder to hydrolyze the monomer remaining in a slight amount.

In the above-mentioned belt polymerization state, for example, polymerization can continuously be carried out on a movable belt. The material of the belt is not especially limited and it may be made of a metal or a glass cloth and the like, and a belt processed with fluorine or Teflon (Registered Trademark) on the surface is preferable. As belt polymerization apparatuses, those which cover reaction blocks so as to control the oxygen concentration in the reaction blocks are preferable and those which enable to heat or cool the belts from the rear face side and/or the upper side are also preferable. The polymer obtained by the belt polymerization may successively be crushed to be powder or modified by post-treatment with a kneader or an extruder.

Among these state, the belt polymerization state is preferable and since it is no need to stir the reaction solution, the viscosity of the reaction solution and the monomer concentration may be set high, resulting in easy removal of the solvent.

As a solvent to be used in the above-mentioned aqueous solution polymerization method, water is mainly to be used and other water-based solvents may be included. The water-based solvents means mixed solvents of one or two or more compounds compatible with water and mixed solvents obtained by mixing such compounds with water in a manner that water is a main component. The compound compatible with water are preferably alcohols such as methanol, ethanol, and 1-propanol; diols such as ethylene glycol; polyalcohols, e.g. triols such as glycerin. Additionally, solutions obtained by mixing reaction products compatible with these compounds may be used as the water-based solvents. Among them, water, or mixed solvents of water and alcohols are preferable to be used.

The water-based solvent to be used for the polymerization can be used preferably in the above-mentioned production method of the present invention.

In the above-mentioned polymerization, a polymerization initiator may be used and for example, an azo initiator and a hydrogen peroxide initiator are preferable. One or two or more type of the initiators may be used. The above-mentioned initiators are preferably used at the above-mentioned ratio. Also, in the case of polymerization, a chain transfer agent may be used if necessary.

The N-vinylamide polymer of the present invention has constitution as described above and advantages in the biocompatibility, safety, and hydrophilicity, and can sufficiently exhibit functions as a thickening agent, a flocculant and the like and thus is useful for production raw materials of pressure sensitive adhesives, coating materials, dispersants, ink, and electronic parts other than pharmaceutical products and cosmetics, additives for food and the like. The production method of the present invention is suitable to produce the N-vinylamide polymer usable for a variety of fields.

BEST MODE FOR CARRYING OUT THE INVENTION

The present invention will, hereinafter, be described in more detail with reference to Examples, but the present invention is not be unduly limited to the Examples. In addition, "part" and "%" mean "part by weight" and "% by weight", as particular notice is not given.

(K-Value Measurement Method)

The K-value was calculated according to the following formula from the relative viscosity of an aqueous solution of 1% by weight of the N-vinylamide polymer measured by a capillary viscometer at 25° C.:

$$\log \eta_{rel}/C = [(75K_0^2)/(1+1.5K_0C)] + K_0,$$

wherein $K=1000K_0$;
C is the weight (g) of N-vinylamide polymer in 100 ml of the solution; and
$\eta_{rel}$ is relative viscosity.

(Measurement Method of N-vinylpyrrolidone and 2-pyrrolidone Amounts)

Quantitative determination was carried out by liquid chromatography.

(Measurement Method of Ashes)

Measurement was carried out according to a measurement method of intensely burned residues defined by Japanese Pharmacopoeia.

The Residue on Ignition Test is a method to measure the mass of the residual substance not volatilized when the sample is ignited by the method described below. Generally, this test is intended for determining the content of inorganic substances contained as impurities in an organic substance, and occasionally, for determining the amount of inorganic substances contained as components in an organic substance or the amount of impurities contained in a volatile inorganic substance.

The description for example, "not more than 0.10% (1 g)," in a monograph, indicates that the mass of the residue is not more than 1.0 mg per 1 g of the substance in the test in which about 1 g of the substance is weighed accurately and ignited by the procedure described below, and "after drying" indicates that the sample is tested after being dried under the conditions specified in the test for Loss on drying.

Procedure

Previously ignite a crucible of platinum, quartz or porcelain to constant mass between 450° C. and 550° C. and weigh accurately after cooling.

Take the sample within the range of ±10% of the amount directed in the monograph, transfer into the above ignited crucible, and weigh it accurately. When the amount of the sample to be taken is indicated in a volume, pipe exactly the amount directed in the monograph and transfer into the above crucible. When directed as "after evaporating", heat properly to evaporate the solution.

Moisten the sample with a few drops of sulfuric acid, then, heat slowly at a temperature as low as practicable until the sample is almost incinerated or volatilized, and cool it. Moisten again with a small amount of sulfuric acid, heat gently until white fumes are evolved no longer, and ignite between 450 and 550° C. until the residue is completely incinerated. Cool the crucible and reweigh accurately. Use a desiccator (silica gel) for cooling.

When the specification of the residue on ignition in the monograph is described as "% or less" or "mg or less" and the amount of the residue obtained above exceeds the limit specified in the monograph, or when the specification is described with a certain range, ignite repeatedly to constant mass.

(APHA Measurement Method)

Measurement was carried out according to JIS K0071. This testing method is a method for determining a color number in Hazen units of a liquid chemical product or a chemical product which becomes molten state if it is heated, by visual comparison of a transmission color in the sample with that in a standard Hazen matching solution. This method can apply to only a color solution which is fawny and transparent and having a color similar to that of standard platinum cobalt.

Apparatus and Implements

Apparatus and Implements are as Follows.
(1) Spectrophotometer according to JIS K0115
(2) Absorption cell optical path length 10 mm square cell
(3) Color comparison tube For liquid sample: an interchangeable ground joint flat-bottomed glass tube having a diameter of 20 mm or more, which is formed of the same material and has the same shape and thickness, and has marked lines at the same height from the bottom such that the liquid level is about 100 mL.

For solid sample: a test tube having the same thickness and a diameter of 25 mm (hard class I: nominal size 25×200) according to JIS R3503

(4) White plate a square filter for qualitative analysis according to JIS P3301 or a material having the equal quality to the filter.

(5) Colorimeter: an apparatus comprises a base frame for standing two or more color comparison tubes, a white and flat glass bottom plate, a black light-shielding plate for preventing scattering light from the side face and a reflecting mirror for guiding light through the bottom plate, and using the apparatus, the color of the solution in the tube can be compared by seeing through the tube from above under scattering daylight.

Apparatus for melting: a apparatus capable of melting a sample for a short time and adjusting a temperature to ±2 to 3° C. of test temperature.

Reagent

Reagents are as Follows.

(1) Cobalt chloride(II) hexahydrate according to JIS K8129
(2) Potassium hexachloroplatinic acid(IV) (potassium chloroplatinic acid) according to JIS K8163
(3) Hydrochloric acid according to JIS K8110

Preparation of Standard Hazen Matching Solution 1,245 g of Potassium hexachloroplatinic acid(IV) and 1,000 g of Cobalt chloride(II) hexahydrate are dissolved in water, and then 100 mL of hydrochloric acid is added thereto. And water is added to prepare 1000 mL of mixture. This mixture is defined as a standard Hazen matching solution No. 500. The absorbance of a standard Hazen matching solution must be within the allowable range shown in Table 1, by the measurement using a spectrophotometer (absorption cell has an optical path length of 10 mm), and using wafer as a comparison solution.

The standard Hazen matching solution No. 500 in an amount shown in Table 2 is charged into a color comparison tube and adding water to give 100 mL of standard Hazen matching solutions under No. 500.

The standard Hazen matching solutions under No. 500 are each charged in a tightly closed colored glass bottle and preserved in dark place. The preservation term is within one year after preparation for the standard Hazen matching solutions No. 500, and within one month after preparation for the standard Hazen matching solutions under No. 500, as a general rule.

TABLE 1

Allowance range of absorbance in standard Hazen matching solution No. 500

| Wavelength nm | Absorbance |
|---|---|
| 430 | 0.110 to 0.120 |
| 455 | 0.130 to 0.145 |
| 480 | 0.105 to 0.120 |
| 510 | 0.055 to 0.065 |

TABLE 2

Standard Hazen matching solution

| Number of standard matching | Amount of standard Hazen matching solution No. 500 (ml) |
|---|---|
| 5 | 1 |
| 10 | 2 |
| 15 | 3 |
| 20 | 4 |
| 25 | 5 |
| 30 | 6 |
| 35 | 7 |
| 40 | 8 |
| 50 | 10 |
| 60 | 12 |
| 70 | 14 |
| 100 | 20 |
| 150 | 30 |
| 200 | 40 |
| 250 | 50 |
| 300 | 60 |
| 350 | 70 |
| 400 | 80 |
| 450 | 90 |
| 500 | 100 |

Operation

Operations are as Follows.

(1) Confirm that the sample and the standard Hazen matching solution has a similar color tone.

(2) If a liquid sample is used, the liquid sample and the standard Hazen matching solution are each charged up to a marked line of the color comparison tube. Then, the tubes are placed above the white plate and their colors are compared under scattering daylight by seeing through the tubes from above to below: or the both tubes are placed in the calorimeter to compare their colors. Then, read the number of the standard Hazen matching solution having the most similar color to that of the sample.

(3) If a solid sample is used, needed amount of the solid sample is charged into a color comparison tube and then the tube is covered to melt the sample in an apparatus for melting adjusted to a test temperature. Then, this tube is immediately stood with the standard Hazen matching solution, and behind the tubes is placed a white plate to compare their colors under scattering daylight by seeing through the tubes from the side face. Then, read the number of the standard Hazen matching solution having the most similar color to that of the sample.

Record of Results

Record the number of the standard Hazen matching solution having the most similar color to that of the sample. If the color of the sample is between the colors of two standard Hazen matching solution, select the solution having a little deeper color.

RECORD EXAMPLE

Hazen Color Number 50

(APHA Measurement Method)

Measurement was carried out according to JIS K0071.

EXAMPLE 1

This example was carried out using a polymerization reaction apparatus shown in FIG. 1. An aqueous monomer solution containing 60 parts of N-vinylpyrrolidone and 40 parts of ion-exchanged water was prepared and nitrogen was bubbled in the solution to sufficiently remove dissolved oxygen. The aqueous monomer solution was fed through a supply port 1 to a reaction vessel whose inside was previously replaced with nitrogen and heated to surface temperature of 100° C. and successively an initiator solution obtained by dissolving 0.06 parts of azo initiator V-59 (trade name; manufactured by Wako Pure Chemical Industries, Ltd.; 2,2'-azobis(2-methylbutyronitrile)) in 1 part of isopropyl alcohol (IPA) was fed through a supply port 2. The solution depth of the reaction solution in the reaction vessel was 10 mm. Under nitrogen flow, polymerization was carried out and the temperature of the reaction solution reached 100° C. in approximately 5 minutes. Thereafter, the temperature of 100° C. or higher was maintained for 15 minutes to obtain colorless, transparent, and slightly soft solid cake.

The obtained cake of polyvinylpyrrolidone (PVP) was analyzed to find that the cake had a K-value of 99.2, contained 5300 ppm of N-vinylpyrrolidone to the resin component and 0.2 ppm of 2-pyrrolidone. The APHA of a 10% aqueous solution was 5 and the content of ashes was 200 ppm. Table 1 shows these results.

EXAMPLE 2

Reaction was carried out in completely same manner as in Example 1, except that the amount of the azo initiator was changed to be 0.12 parts. The temperature of the reaction solution reached 100° C. in approximately 5 minutes. Thereafter, the temperature of 100° C. or higher was maintained for 12 minutes to obtain colorless, transparent, and slightly soft solid cake. It was found by analysis that the obtained cake had a K-value of 95.3, contained 2400 ppm of N-vinylpyrrolidone to the resin component and 0.1 ppm of 2-pyrrolidone. The APHA of a 10% aqueous solution was 5 and the content of ashes was 200 ppm. Table 1 shows these results.

EXAMPLE 3

Reaction was carried out in completely same manner as in Example 1, except that the total amount of the aqueous monomer solution was adjusted and the liquid depth of the reaction solution was changed to be 15 mm. The temperature of the reaction solution reached 100° C. in approximately 5 minutes. Thereafter, the temperature of 100° C. or higher was maintained for 17 minutes to obtain colorless, transparent, and slightly soft solid cake. It was found by analyses that the obtained cake had a K-value of 100.0, contained 5700 ppm of N-vinylpyrrolidone to the resin component and 0.2 ppm of 2-pyrrolidone. The APHA of a 10% aqueous solution was 5 and the content of ashes was 200 ppm. Table 1 shows these results.

EXAMPLE 4

Figure 2:
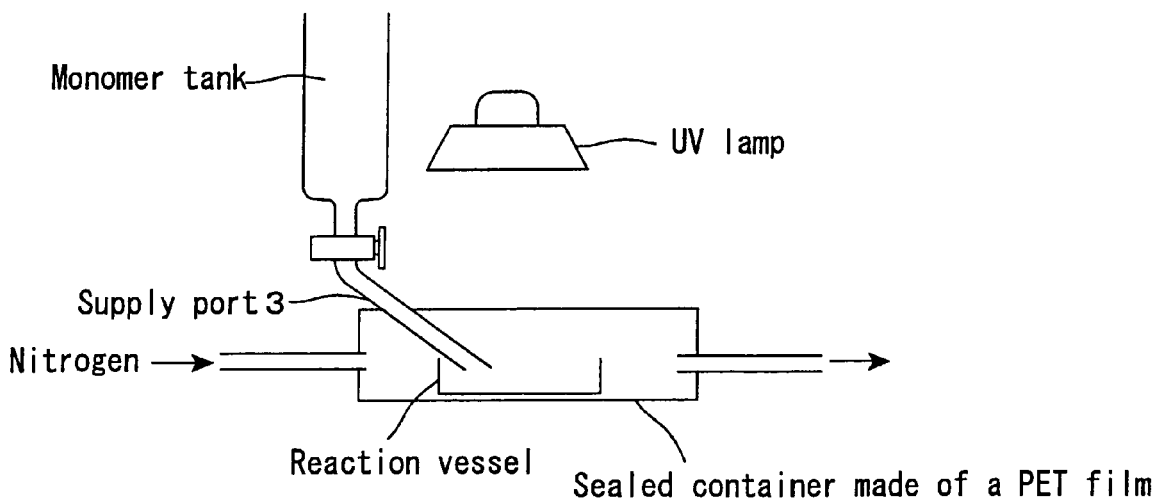
FIG. 2 is a schematic drawing of a reaction apparatus employed in Examples.

This Example was carried out using a polymerization reaction apparatus shown in FIG. 2. An aqueous monomer solution containing 70 parts of N-vinylpyrrolidone, 30 parts of ion-exchanged water, and 0.14 parts of azo initiator (V-59) was prepared and nitrogen was bubbled in the solution to sufficiently remove dissolved oxygen. The aqueous monomer solution was fed through a supply port 3 to a reaction vessel whose inside was previously replaced with nitrogen. The solution depth of the reaction solution in the reaction vessel was 4 mm. Under nitrogen flow, intense UV rays of 20 W/m$^2$ dose were radiated for 10 minutes to obtain colorless, transparent, and hard resin cake.

The obtained cake of polyvinylpyrrolidone (PVP) was analyzed to find that the cake had a K-value of 92.1, contained 4200 ppm of N-vinylpyrrolidone to the resin component and no 2-pyrrolidone was detected. The APHA of a 5% aqueous solution was 5 and the content of ashes was 200 ppm. Table 1 shows these results.

EXAMPLE 5

Reaction was carried out in completely same manner as in Example 4, except that the amounts of N-vinylpyrrolidone was changed to be 60 parts and ion-exchanged water was changed to be 40 parts and consequently the K-value was 93.1, N-vinylpyrrolidone content was 11000 ppm, and no 2-pyrrolidone was detected. The APHA of a 5% aqueous solution was 5 and the content of ashes was 200 ppm. Table 1 shows these results.

TABLE 1

|  |  | Example 1 | Example 2 | Example 3 | Example 4 | Example 5 |
|---|---|---|---|---|---|---|
|  |  | Heating polymerization | | | UV polymerization | |
| Condition | Polymerization concentration (% by weight) | 60 | 60 | 60 | 70 | 60 |
|  | Initiator (% by weight to monomer) | 0.1 | 0.2 | 0.1 | 0.2 | 0.2 |
|  | Solution depth (mm) | 10 | 10 | 15 | 4 | 4 |
|  | Time at 100° C. or higher (min) | 15 | 12 | 17 | — | — |
| Results | K-value | 99.2 | 95.3 | 100.0 | 92.1 | 93.1 |
|  | NVP(ppm) | 5300 | 2400 | 5700 | 4200 | 11000 |
|  | 2-py(ppm) | 2 | 0.1 | 0.2 | ND | ND |
|  | Ashes (ppm) | 200 | 200 | 200 | 200 | 200 |
|  | APHA | 5 | 5 | 5 | 5 | 5 |

In Table 1, "ND" means no detection.

COMPARATIVE EXAMPLE 1

Reaction was carried out in completely same manner as in Example 1, except that the solution depth of the reaction solution was changed to be 55 mm. In this case, the reaction solution caused bumping to make it impossible to carry out reaction operation safely.

COMPARATIVE EXAMPLE 2

Reaction was carried out in completely same manner as in Example 1, except that the initial monomer concentration of the reaction solution was changed to be 40%. The reaction was promoted slowly and it took 1 hour or longer to achieve polymerization ratio of 90% or higher. The content of 2-pyrrolidone was 300 ppm.

EXAMPLE 6

An aqueous monomer solution containing 60 parts of N-vinylpyrrolidone and 40 parts of ion-exchanged water was prepared and nitrogen was bubbled in the solution to sufficiently remove dissolved oxygen. The aqueous monomer solution at 1000 g/min and a 5% isopropyl alcohol (IPA) solution of 2,2'-azobis(2-methylbutyronitrile) at 12 g/min were line-mixed and supplied to a movable belt type polymerization apparatus under nitrogen atmosphere with a current flowing. The temperature of the belt surface was adjusted to be 80° C. by heating the belt from the rear side. The thickness of the aqueous solution was 20 mm. The movable belt was moved at 100 mm/min and the temperature of the reaction system exceeded 100° C. after 8 minutes and was kept continuously 100° C. or higher for approximately 10 minutes.

The obtained PVP was analyzed to find that PVP had a K-value 98.0, NVP 4000 ppm to the resin component, 2-pyrrolidone 0.2 ppm, ashes 100 ppm, and 10% APHA 5.

EXAMPLE 7

An aqueous monomer solution containing 40 parts of N-vinylpyrrolidone and 60 parts of ion-exchanged water was fed to a double-arm type kneader made of a stainless steel, equipped with a jacket having 13 L inner capacity and two sigma type blades with a rotary diameter 120 mm. The monomer solution was degassed by nitrogen gas and the ambient gas of the reaction system was replaced with nitrogen. After that, water at 20° C. was circulated in the jacket to control the temperature and 0.04 parts of azo initiator (V-59) as an initiator was added. Under stirring condition, reaction was carried out for 60 minutes and in this case, the highest temperature reached 90° C.

The obtained PVP was analyzed to find that PVP had a K-value 92.0, NVP 4500 ppm to the resin component, 2-pyrrolidone 10 ppm, ashes 100 ppm, and 10% APHA 5.

SYNTHESIS EXAMPLE 1

This synthesis was carried out using a polymerization reaction apparatus shown in FIG. 1. An aqueous monomer solution containing 60 parts of N-vinylpyrrolidone and 40 parts of ion-exchanged water was prepared and nitrogen was bubbled in the solution to sufficiently remove dissolved oxygen. The aqueous monomer solution was fed through a supply port 1 to a reaction vessel whose inside was previously replaced with nitrogen and heated to surface temperature of 100° C. and successively an initiator solution obtained by dissolving 0.06 parts of azo initiator (V-59) in 1 part of ethanol was fed through a supply port 2. The solution depth of the reaction solution in the reaction vessel was 10 mm. Under nitrogen flow, polymerization was carried out and the temperature of the reaction solution reached 100° C. in approximately 5 minutes. Thereafter, the temperature of 100° C. or higher was maintained for 15 minutes to obtain colorless, transparent, and sheet-like polyvinylpyrrolidone.

The obtained polyvinylpyrrolidone was pulverized by a pulverizer and sieved by a vibrating sieve. A powder with an average particle diameter of 150 μm was defined as a powder 1 and a powder with an average particle diameter of 700 μm was defined as a powder 2 to use them for evaluation.

Examples 8 and 9 and Comparative Examples 3 and 4

The powder 1 and powder 2 in a small amount were spread thinly on trays in a constant temperature and humidity apparatus adjusted to be in prescribed conditions and kept standing. The powders were taken out after 3 hours and analyzed. The conditions and the results are shown in Table 2. In the initial period (before the treatment in the constant temperature and humidity apparatus), the amounts of the remaining N-vinylpyrrolidone (NVP) and 2-pyrrolidone (2-py) were 5000 ppm and 0.2 ppm, respectively, and hue (APHA) was 5.

TABLE 2

|  | Example 8 | Example 9 | Comparative Example 3 | Comparative Example 4 |
|---|---|---|---|---|
| Average particle diameter (mm) | 150 | 150 | 700 | 150 |
| Temperature (° C.) | 90 | 90 | 90 | 90 |
| Relative humidity (% RH) | 70 | 60 | 70 | 20 |
| NVP(ppm) | 3 | 9 | 100 | 3300 |
| 2-py(ppm) | 0.1 | 0.1 | 0.2 | 0.2 |
| APHA | 5 | 5 | 5 | 5 |

The present application claims priority under 35 U.S.C. § 119 to Japanese Patent Application No. 2004-087741 filed Mar. 24, 2004, entitled "N-VINYLAMIDE POLYMER AND PRODUCTION METHOD THEREOF." and Japanese Patent Application No. 2004-087742 filed Mar. 24, 2004, entitled "N-VINYLAMIDE POLYMER AND PRODUCTION METHOD THEREOF." The contents of these applications are incorporated herein by reference in their entirely.

The invention claimed is:

1. An N-vinylamide polymer comprising an N-vinylamide monomer unit,
    wherein said N-vinylamide polymer has K-value of 60 or higher, a content of hydrolysis products of N-vinylamide monomer of 0.02% by weight or less, a content of ashes of 0.05% by weight or less, and hue of 10% aqueous solution of 10 or less measured according to JIS K0071.

2. An N-vinylamide polymer comprising an N-vinylamide monomer unit,
    wherein said N-vinylamide polymer has a content of a N-vinylamide monomer of 10 ppm or less and a content of hydrolysis products of N-vinylamide monomer of 100 ppm or less.

3. The N-vinylamide polymer comprising an N-vinylamide monomer unit according to claim 1, wherein the N-vinylamide polymer is prepared by a production method which comprises polymerizing a monomer component in a water-based solvent and wherein the polymerizing is carried out by adjusting a monomer concentration in a reaction solution to be 40 to 90% by weight and using an azo initiator and/or hydrogen peroxide.

4. The N-vinylamide polymer comprising an N-vinylamide monomer unit according to claim 2,
wherein the N-vinylamide polymer is prepared by a production method which comprises polymerizing a monomer component in a water-based solvent and wherein the polymerizing is carried out by adjusting a monomer concentration in a reaction solution to be 40 to 90% by weight and using an azo initiator and/or hydrogen peroxide.

5. The N-vinylamide polymer comprising an N-vinylamide monomer unit according to claim 3,
wherein the polymerizing is carried out by keeping a temperature of the reaction solution to be 100° C. or higher for 3 to 45 minutes.

6. The N-vinylamide polymer comprising an N-vinylamide monomer unit according to claim 4,
wherein the polymerizing is carried out by keeping a temperature of the reaction solution to be 100° C. or higher for 3 to 45 minutes.

7. The N-vinylamide polymer comprising an N-vinylamide monomer unit according to claim 3,
wherein the polymerizing is carried out by keeping the solution depth of the reaction solution to be 50 mm or shallower.

8. The N-vinylamide polymer comprising an N-vinylamide monomer unit according to claim 4,
wherein the polymerizing is carried out by keeping the solution depth of the reaction solution to be 50 mm or shallower.

9. The N-vinylamide polymer comprising an N-vinylamide monomer unit according to claim 4,
wherein the production method comprises treating the N-vinylamide polymer in a powder state with a particle size of 500 μm or smaller or in a film-like state with a thickness of 10 mm or thinner in a condition of relative humidity of 50% or higher.

10. The N-vinylamide polymer comprising an N-vinylamide monomer unit according to claim 9,
wherein the treating is carried out under a condition of 50 to 150° C.

11. The N-vinylamide polymer comprising an N-vinylamide monomer unit according to claim 9,
wherein the treating is carried out in a condition that the N-vinylamide polymer in a powder state is stirred and/or fluidized under a current of gas.

12. The N-vinylamide polymer comprising an N-vinylamide monomer unit according to claim 1 which has a content of a N-vinylamide monomer of 10 ppm or less and a content of hydrolysis products of N-vinylamide monomer of 100 ppm or less.

13. The N-vinylamide polymer comprising an N-vinylamide monomer unit according to claim 12 where the ash content is 0.02% by weight or less.

14. The N-vinylamide polymer comprising an N-vinylamide monomer unit according to claim 1 where the ash content is 0.002% by weight or less.

\* \* \* \* \*